(12) United States Patent
Lee

(10) Patent No.: US 12,344,081 B2
(45) Date of Patent: Jul. 1, 2025

(54) SLIDING DOOR DEVICE FOR VEHICLE

(71) Applicants:Hyundai Motor Company, Seoul (KR); Kia Corporation, Seoul (KR)

(72) Inventor: Jaeseung Lee, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 500 days.

(21) Appl. No.: 17/977,798

(22) Filed: Oct. 31, 2022

(65) Prior Publication Data

US 2023/0202273 A1    Jun. 29, 2023

(30) Foreign Application Priority Data

Dec. 24, 2021  (KR) .......................... 10-2021-0187697

(51) Int. Cl.
   *B60J 5/06*    (2006.01)
(52) U.S. Cl.
   CPC ...................................... *B60J 5/06* (2013.01)
(58) Field of Classification Search
   CPC . B60J 5/06; B60J 5/047; E05F 15/632; E05D 11/0081; E05D 15/101
   USPC ...................................................... 296/146.1
   See application file for complete search history.

(56) References Cited

U.S. PATENT DOCUMENTS

| | | | |
|---|---|---|---|
| 6,358,073 B1 * | 3/2002 | Jhanson | B60R 16/0207 439/4 |
| 2001/0004022 A1 * | 6/2001 | Kobayashi | B60R 16/0207 174/72 A |
| 2003/0184118 A1 * | 10/2003 | Sano | H02G 11/006 296/155 |
| 2018/0178740 A1 * | 6/2018 | Tomosada | B60R 16/0215 |
| 2023/0148422 A1 * | 5/2023 | Lee | E05D 15/101 296/146.1 |
| 2023/0173897 A1 * | 6/2023 | Lee | B60J 5/06 296/146.1 |
| 2023/0182550 A1 * | 6/2023 | Lee | E05D 15/101 296/155 |

(Continued)

FOREIGN PATENT DOCUMENTS

| | | | | |
|---|---|---|---|---|
| DE | 102006040070 A1 * | 2/2008 | | B60J 5/06 |
| DE | 102017223204 A1 * | 6/2018 | | B60R 16/0215 |
| EP | 1314613 A2 * | 5/2003 | | B60R 16/027 |

(Continued)

*Primary Examiner* — Hilary L Gutman
(74) *Attorney, Agent, or Firm* — Morgan, Lewis & Bockius LLP

(57) ABSTRACT

A sliding door device includes a door arm including one end portion rotatably connected to one end portion of a door, and the other end portion movable along a side sill of the vehicle body, a lower slider coupled to the second end portion of the door arm and configured to be rectilinearly movable along the side sill of the vehicle body, a lower arm plate connecting the second end portion of the door arm and the lower slider and configured to perform a rotation and a rectilinear movement when the lower slider moves along the side sill, a door power connection portion provided between the lower slider and one end portion of the door arm, and a vehicle power connection portion provided at a position on the vehicle body corresponding to the door power connection portion and electrically connected to the door power connection portion by a rotation of the door arm.

13 Claims, 10 Drawing Sheets

(56) References Cited

U.S. PATENT DOCUMENTS

2023/0202272 A1\* 6/2023 Lee .................... B60R 16/0207
                                                                                                     49/70
2024/0175309 A1\* 5/2024 Lee ...................... E05F 15/662

FOREIGN PATENT DOCUMENTS

| JP | 2007176233 A | \* | 7/2007 |
| JP | 2007283949 A | \* | 11/2007 |
| JP | 2008005589 A | \* | 1/2008 |
| JP | 2008094132 A | \* | 4/2008 |
| JP | 2008094133 A | \* | 4/2008 |
| KR | 20100054320 A | \* | 5/2010 |

\* cited by examiner

SLIDING DOOR DEVICE FOR VEHICLE

CROSS-REFERENCE TO RELATED APPLICATION

The present application claims priority to Korean Patent Application No. 10-2021-0187697 filed on Dec. 24, 2021, the entire contents of which is incorporated herein for all purposes by this reference.

BACKGROUND OF THE PRESENT DISCLOSURE

Field of the Present Disclosure

The present disclosure relates to a sliding door device for a vehicle, and more particularly, to a sliding door device for a vehicle, which is configured to open or close a door opening portion of a vehicle body while sliding forward or rearward in a longitudinal direction of a vehicle.

Description of Related Art

In general, a vehicle has an occupant compartment having a predetermined size in which a driver or an accompanied occupant may be accommodated, and occupant compartment opening/closing doors are provided on a vehicle body to open or close the occupant compartment.

In the case of a passenger vehicle, the occupant compartment opening/closing doors include a front door provided at a front side in a longitudinal direction of the vehicle and a rear door provided at a rear side in the longitudinal direction of the vehicle. The front door and the rear door are typically provided on the vehicle body to be rotatable by hinges.

Meanwhile, in the case of a van in which many persons may be accommodated, the occupant compartment opening/closing doors slide forward and rearward in the longitudinal direction of the vehicle to open or close the occupant compartment.

In the case of the slide type occupant compartment opening/closing door for a van, the occupant compartment opening/closing door is configured to move rearward in the longitudinal direction of the vehicle to open the occupant compartment, and move forward in the longitudinal direction of the vehicle to close the occupant compartment. Therefore, the slide type occupant compartment opening/closing door has an advantage in that a space required to open or close the door is smaller in the slide type occupant compartment opening/closing door than in the hinged occupant compartment opening/closing door applied to the passenger vehicle and a door opening formed in the vehicle body may be completely opened even though the space required to open or close the door is small.

However, in the case of the slide type occupant compartment opening/closing door generally, a space in which a door arm is provided to penetrate into a side sill portion of the vehicle at the time of opening or closing the door is excessively large because of a fixed sliding door arm structure. For the present reason, there is a problem in that a height of a floor of the vehicle needs to be increased to ensure the space.

Furthermore, in the case of a powered sliding occupant compartment opening/closing door generally, a sliding door needs to be automatically closed by operation of a switch or an outside handle after the sliding door is opened, and a power cable serves to transmit power and signals. However, the configuration of the power cable causes an increase in costs and difficulty in configuring a layout.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a sliding door device for a vehicle, which adopts a slip-ring-type door power connection structure connected along a movement trajectory of a door arm, implementing a powered sliding door without a power cable and solving a problem of an excessively large space in which the door arm is provided to penetrate into a side sill portion of a vehicle.

According to various aspects of the present disclosure are directed to providing a sliding door device for a vehicle, the sliding door device including: a door configured to open or close a door opening portion formed in a vehicle body; a door arm including a first end portion rotatably connected to an end portion of the door, and a second end portion configured to be movable along a side sill of the vehicle body; a lower slider coupled to the second end portion of the door arm and configured to be rectilinearly movable along the side sill of the vehicle body; a lower arm plate connecting the second end portion of the door arm and the lower slider and configured to perform a rotation and a rectilinear movement when the lower slider moves along the side sill; a door power connection portion electrically connected to the lower arm plate, extending through the door arm, and configured to transmit power required for the door; a power plate provided in a movement route for the lower arm plate of the side sill and electrically connected to the door power connection portion; and a vehicle power connection portion electrically connected to the power plate and configured to transmit power, which is required for the door, to the door power connection portion through the power plate.

A plurality of first rollers may protrude from the lower arm plate and be spaced from one another at predetermined intervals, and the first rollers may be inserted into a plurality of rails provided on an upper surface of the side sill and move therealong.

The first rollers may include two rollers each including a first height, and two rollers each including a second height smaller than the first height, the four rollers may be alternately disposed, and the plurality of rails may each have a depth corresponding to the height of each of the two rollers each including the first height and the two rollers each including the second height.

The first roller may be coupled to a periphery of a roller shaft protruding on the lower arm plate, a roller electrode may be provided in the roller shaft and penetrate the roller shaft in a direction perpendicular to the lower arm plate, an upper end portion of the roller electrode may be in contact with the power plate to define electrical connection, and a lower end portion of the roller electrode may be in contact with the door power connection portion to define electrical connection.

The door power connection portion and the vehicle power connection portion may each be configured as an electric wire.

The power plate may be configured as a copper (Cu) plate.

The door power connection portion may be inserted into a groove provided in the lower arm plate and disposed in a longitudinal direction of the door arm.

The roller electrode may be provided in the roller shaft to which the roller, which has the first height among the first rollers, is coupled.

The other end portion of the door arm, the lower slider, and the lower arm plate may be connected by an arm pin in a direction perpendicular to the vehicle body, and the door arm and the lower arm plate may be configured to rotate about the arm pin.

The other end portion of the door arm may have two layers disposed in a vertical direction, and the lower slider may be coupled between the two layers of the second end portion of the door arm by the arm pin.

The lower arm plate may be rotatably coupled to an upper surface of the door arm by the arm pin.

One end portion of the door arm may be hingedly and rotatably connected to the door by a door pin.

A second roller may protrude from an upper surface of the door arm between the first end portion and the second end portion of the door arm so that the door arm moves along a route through which the door arm turns toward the outside of the vehicle body.

According to the exemplary embodiment of the present disclosure, the slip-ring-type door power connection structure connected along the movement trajectory of the door arm may be adopted, and a power cable configuration may be eliminated, reducing costs and improving a degree of layout freedom.

Furthermore, the penetration of the door arm into the vehicle body may be eliminated, implementing a flat structure of the vehicle body and thus reducing a height (step height) of the vehicle body.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
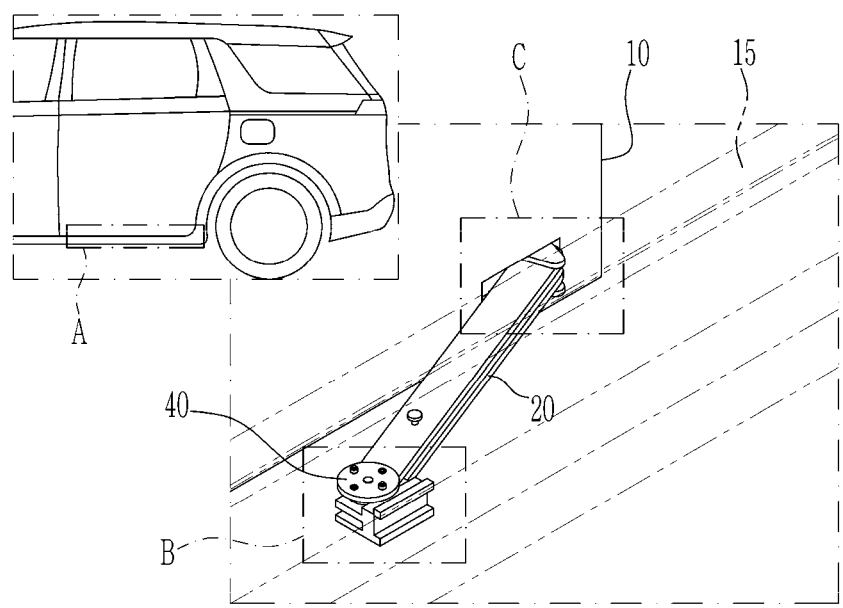
FIG. 1 is a view schematically illustrating a sliding door device for a vehicle according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments of the present disclosure will be described in detail with reference to the accompanying drawings so that those with ordinary skill in the art to which an exemplary embodiment of the present disclosure pertains may easily carry out the embodiments. The present disclosure may be implemented in various different ways and is not limited to the exemplary embodiments described herein.

Furthermore, the constituent elements having the same configurations in the several embodiments will be assigned with the same reference numerals and described only in the representative embodiment, and only the constituent elements, which are different from the constituent elements according to the representative embodiment, will be described in other exemplary embodiments of the present disclosure.

It is noted that the drawings are schematic and are not illustrated based on actual scales. Relative dimensions and proportions of parts illustrated in the drawings are exaggerated or reduced in size for clarity and convenience in the drawings, and any dimension is just illustrative but not restrictive. The same reference numerals designate the same structures, elements or components illustrated in two or more drawings in order to exhibit similar characteristics. When one component is described as being positioned "above" or "on" another component, one component can be positioned "directly on" another component, and one component can also be positioned on another component with other components interposed therebetween.

The exemplary embodiment of the present disclosure specifically illustrates an example of the present disclosure. As a result, various modifications of the drawings are expected. Therefore, the embodiments are not limited to specific forms in regions illustrated in the drawings, and for example, include modifications of forms by the manufacture thereof.

Hereinafter, a structure of a sliding door device for a vehicle according to various exemplary embodiments of the present disclosure will be described in detail with reference to the accompanying drawings.

Figure 2:
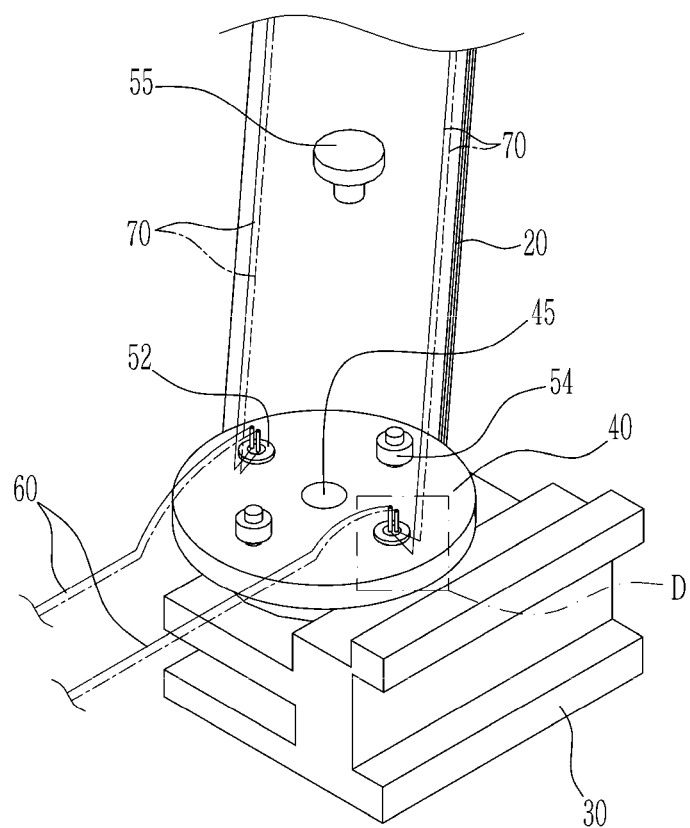
FIG. 2 is an enlarged view of part 'B' in FIG. 1.
Figure 3:
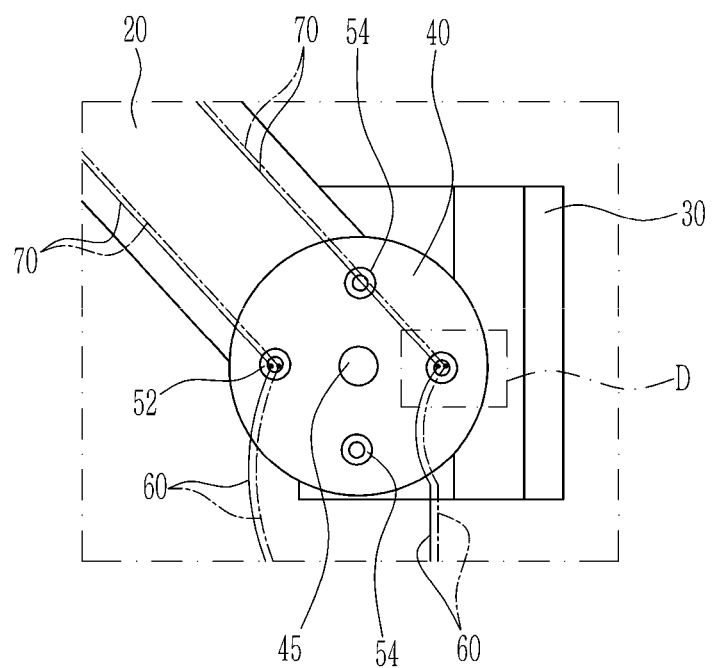
FIG. 3 is a top plan view exemplarily illustrating the sliding door device for a vehicle according to the exemplary embodiment of the present disclosure when viewed from above.

FIG. 1 is a view schematically illustrating a sliding door device for a vehicle according to various exemplary embodiments of the present disclosure, FIG. 2 is an enlarged view of part 'B' in FIG. 1, and FIG. 3 is a top plan view exemplarily illustrating the sliding door device for a vehicle according to the exemplary embodiment of the present disclosure when viewed from above.

Referring to FIG. 1, the sliding door device for a vehicle according to the exemplary embodiment of the present disclosure may be applied to a lower side, i.e., part 'A' of a rear door 10 provided at a rear side based on a longitudinal direction of the vehicle. The sliding door device may be applied to a structure in which the rear door 10 is opened or closed while moving toward the inside or outside of the vehicle and sliding forward or rearward in the longitudinal direction of the vehicle. Furthermore, the structure of the sliding door device for a vehicle according to the exemplary embodiment of the present disclosure may also be applied to a front door as well as the rear door 10.

Referring to FIG. 2 and FIG. 3, the sliding door device for a vehicle according to the exemplary embodiment of the present disclosure includes a door 10, a door arm 20, a lower slider 30, a lower arm plate 40, a door power connection portion 70, power plates 60, and vehicle power connection portions 80.

The door 10 opens or closes a door opening portion formed in a vehicle body of the vehicle. The door arm 20 is connected to the door 10 and the vehicle body. One end portion of the door arm 20 may be rotatably connected to one side of the door 10, and the other end portion of the door arm 20 may be rotatably and rectilinearly movably connected to a side sill 15 of the vehicle body. The side sill 15 may be provided at a lateral lower side of the vehicle body and disposed in the longitudinal direction of the vehicle body. A side rail may be provided on the side sill 15 and provide a route through which the other end portion of the door arm 20 may move.

The lower slider 30 is coupled to the other end portion of the door arm 20, and the lower slider 30 may rectilinearly move along the side rail provided in a longitudinal direction of the side sill 15.

Furthermore, the lower arm plate 40 is coupled to the other end portion of the door arm 20 and connects the other end portion of the door arm 20 and the lower slider 30. The lower arm plate 40 may perform a rotation and a rectilinear movement when the lower slider 30 moves along the side rail provided on the side sill 15. The lower arm plate 40 may be provided to perform a cycloidal rotation along a cycloidal rail disposed on the side sill 15 and provided in the longitudinal direction of the vehicle body.

Meanwhile, a plurality of first rollers may protrude on the lower arm plate 40 and spaced from one another at predetermined intervals in a circumferential direction of the lower arm plate 40. The first rollers may be inserted into four rails 62 provided on the side sill 15 and move. In the instant case, the rails 62 may be configured as cycloidal rails so that the first rollers are inserted into the rails 62 and moves so that the lower arm plate 40 may perform the cycloidal rotation.

Meanwhile, the first rollers include two rollers 52 each including a first height and two rollers 54 each including a second height smaller than the first height, and the two rollers 52 and the two rollers 54 may be alternately disposed. The plurality of rails may each have a depth corresponding to the height of each of the four rollers 52 and 54.

The other end portion of the door arm 20, the lower slider 30, and the lower arm plate 40 may be coupled in a vertical direction of the vehicle body by an arm pin 45. The door arm 20 and the lower arm plate 40 may rotate about the arm pin 45 relative to the lower slider 30.

Furthermore, a second roller 55 may protrude on an upper surface of the door arm 20 between one end portion and the other end portion of the door arm 20 so that the door arm 20 moves along a route through which the door arm 20 turns toward the outside of the vehicle body.

The door power connection portions 70 may be electrically connected to the lower arm plate 40 and extend in the longitudinal direction of the door arm 20 through the door arm 20, transmitting necessary power to the door. The other end portion of the door arm 20 may have two layers disposed in the vertical direction of the vehicle body. The door power connection portions 70 may be positioned and extend between the two layers of the other end portion of the door arm 20. The door power connection portions 70 may each be configured as an electric wire.

The power plates 60 may be disposed on the side sill 15 of the vehicle body. The power plates 60 may be provided on a movement route for the lower arm plate 40 and electrically connected to the door power connection portions 70. The power plate 60 may be configured as a copper (Cu) plate.

The vehicle power connection portions 80 may be electrically connected to the power plates 60 and transmit power, which is required for the door 10, to the door power connection portions 70 through the power plates 60. The vehicle power connection portion 80 may be configured as an electric wire.

Figure 4:
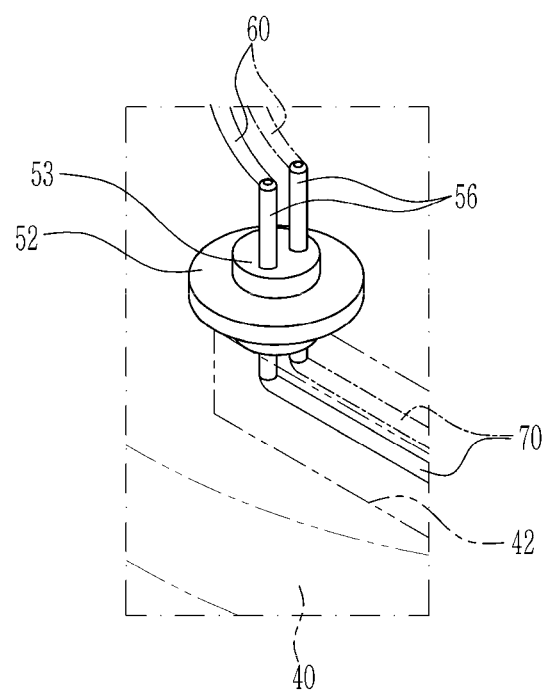
FIG. 4 is an enlarged view of part 'D' in FIG. 3.

FIG. 4 is an enlarged view of part 'D' in FIG. 3.

Referring to FIG. 4, the electrical connection between the door power connection portions 70 and the power plates 60 may be implemented by the two first rollers 52 each including the first height. That is, the first rollers 52 each including the first height are coupled to be rotatable about roller shafts 53 protruding on the lower arm plate 40. Roller electrodes 56 may be provided in the roller shafts 53 and penetrate the roller shafts 53 in a direction perpendicular to the lower arm plate 40. The power plate 60 is in contact with an upper end portion of the roller electrode 56 to define electrical connection, and the door power connection portion 70 is in contact with a lower end portion of the roller electrode 56 to define electrical connection.

The door power connection portions 70 may be inserted into grooves 42 provided in the lower arm plate 40 and disposed in the longitudinal direction of the door arm 20. The roller electrode 56 may be provided as a pair of roller electrodes 56 disposed side by side thereof. The plurality of door power connection portions 70 and the plurality of power plates 60, which are in contact with the roller electrodes 56, may be provided to be equal in number to the roller electrodes 56.

Figure 5:
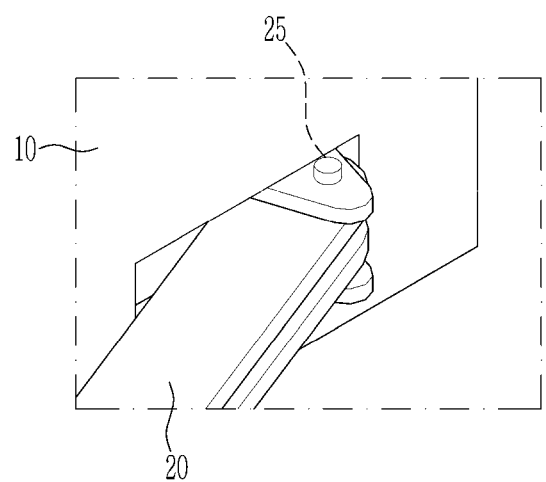
FIG. 5 is an enlarged view of part 'C' in FIG. 1.

FIG. 5 is an enlarged view of part 'C' in FIG. 1.

As illustrated in FIG. 5, one end portion of the door arm 20 may be hingedly and rotatably connected to the door 10 by a door pin 25. The door pin 25 may vertically penetrate one end portion of the door arm 20 through a protruding portion formed on the door 10 and connect the door arm 20 to the door 10.

Figure 6:
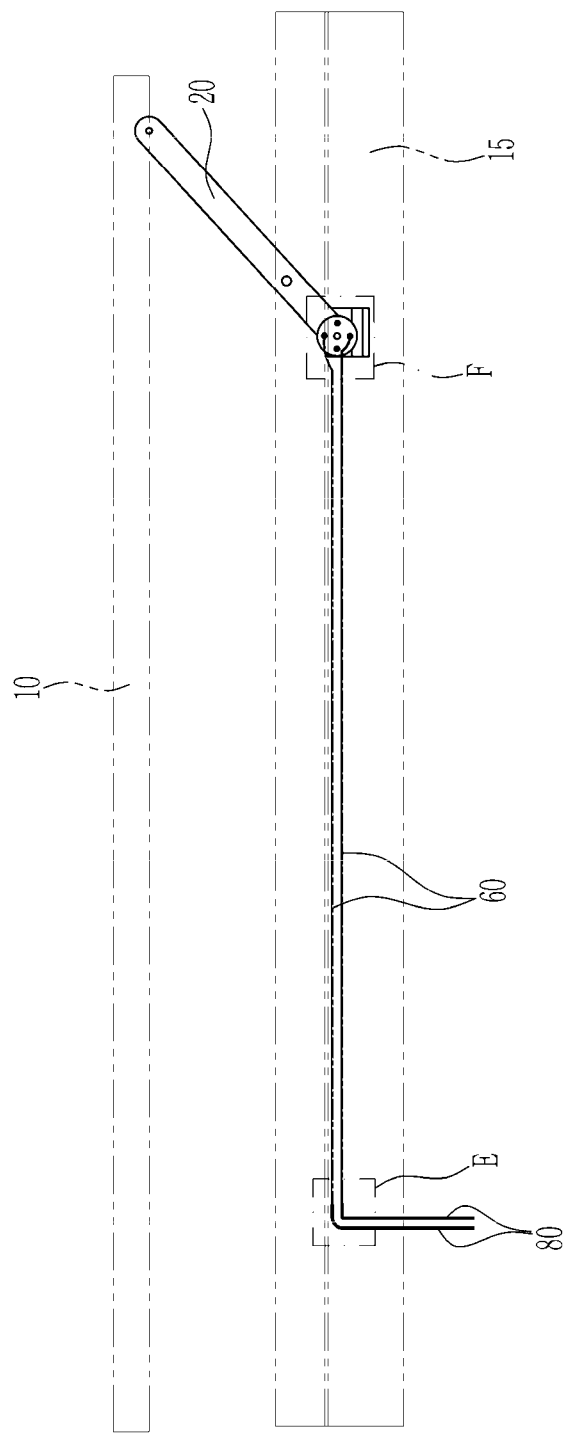
FIG. 6 is a view exemplarily illustrating an operating state of the sliding door device for a vehicle according to the exemplary embodiment of the present disclosure.
Figure 7:
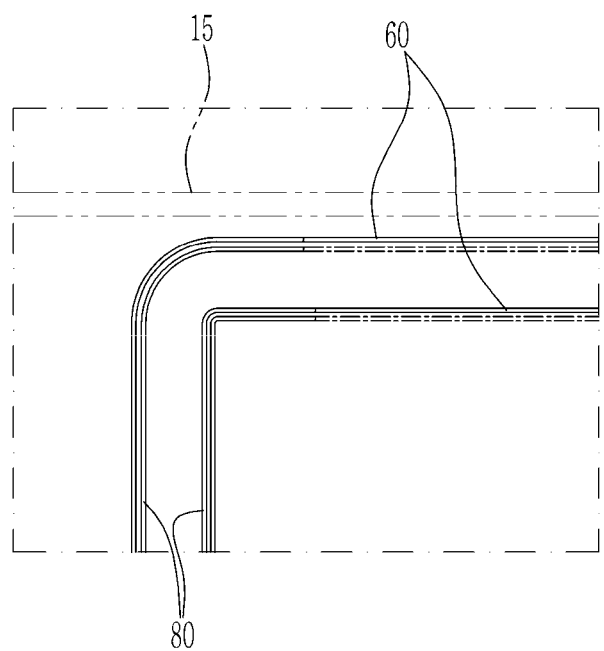
FIG. 7 is an enlarged view of part 'E' in FIG. 6.

FIG. 6 is a view exemplarily illustrating an operating state of the sliding door device for a vehicle according to the exemplary embodiment of the present disclosure, and FIG. 7 is an enlarged view of part 'E' in FIG. 6.

Referring to FIG. 6 and FIG. 7, the power plates 60 are provided in the movement route for the lower arm plate 40 and disposed in the longitudinal direction of the side sill 15 of the vehicle. One side of the power plate 60 is electrically connected to the roller electrode 56 provided on the lower arm plate 40, and the other side of the power plate 60 is electrically connected to the vehicle power connection portion 80. The vehicle power connection portions 80 may be provided on the side sill 15 and extend in a direction opposite to the door 10. The plurality of vehicle power connection portions 80 may be provided to be in contact with the power plates 60 and equal in number to the power plates 60.

Figure 8:
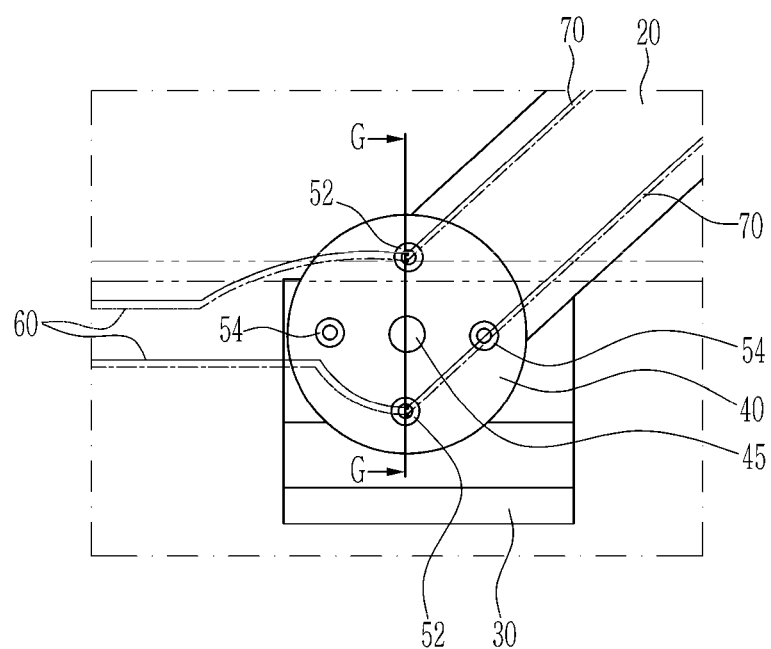
FIG. 8 is an enlarged view of part 'F' in FIG. 6.
Figure 9:
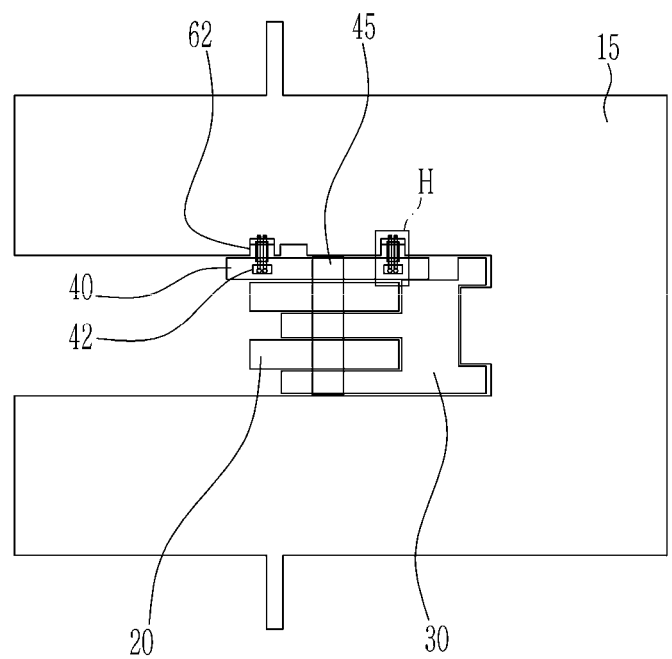
FIG. 9 is a view taken along line 'G-G' in FIG. 8.
Figure 10:
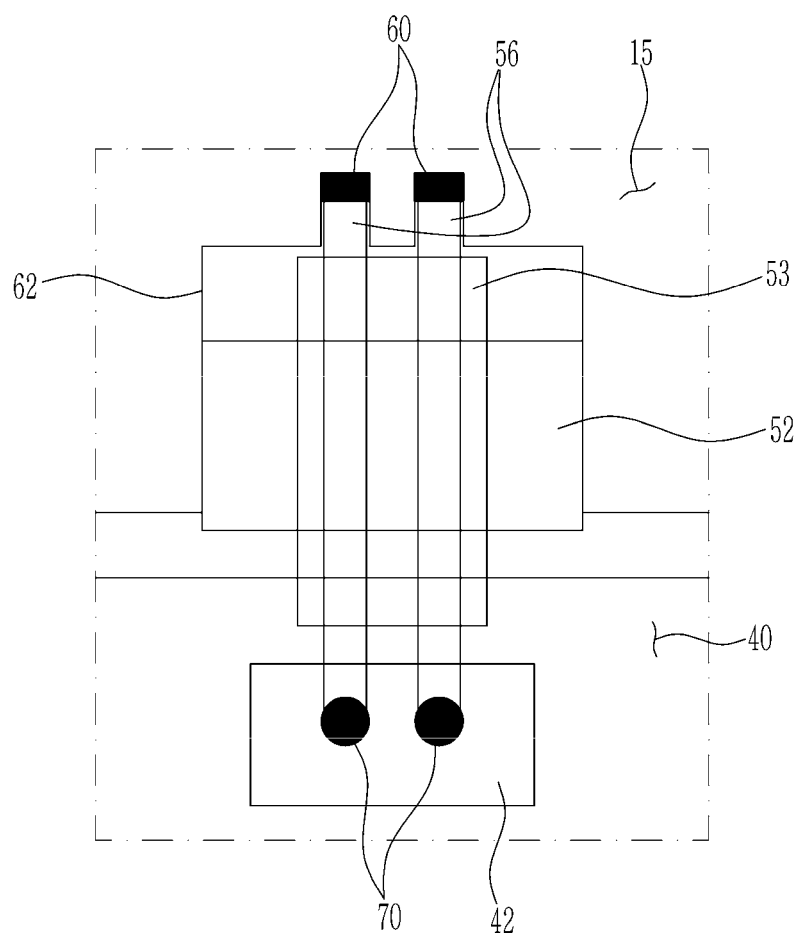
FIG. 10 is an enlarged view of part 'H' in FIG. 9.

FIG. 8 is an enlarged view of part 'F' in FIG. 6, FIG. 9 is a view taken along line 'G-G' in FIG. 8, and FIG. 10 is an enlarged view of part 'H' in FIG. 9.

Referring to FIG. 8 and FIG. 9, the plurality of rails 62 may be provided on the upper surface of the side sill 15 and each have a depth corresponding to the height of the first roller 52. The roller electrode 56 is provided in the roller shaft 53 including an external surface surrounded by the first roller 52 and is vertically provided to penetrate the roller shaft 53. In the instant case, the first roller 52 may be a roller including the first height.

As illustrated in FIG. 10, the power plate 60 is attached to the upper surface of the rail 62 along the rail 62, and the upper end portion of the roller electrode is in contact with the power plate. Furthermore, the lower end portion of the roller electrode is in contact with the door power connection portion inserted into the groove provided in the lower arm plate and disposed in the longitudinal direction of the door arm 20. Therefore, the electrical connection between the door power connection portion 70 and the power plate 60 may be implemented by the roller electrode.

The above-mentioned connection structure maintains the contact between the roller electrode 56 and the power plate 60 even while the first roller moves along the rail 62. Therefore, necessary power may be continuously transmitted to the door 10 without electrical connection interruption even at the time of opening or closing the door 10.

According to the exemplary embodiment of the present disclosure described above, the slip-ring-type door power connection structure connected along the movement trajectory of the door arm may be adopted, and a power cable configuration may be eliminated, reducing costs and improving a degree of layout freedom.

Furthermore, the penetration of the door arm into the vehicle body may be eliminated, implementing a flat structure of the vehicle body and thus reducing a height (step height) of the vehicle body.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A sliding door apparatus for a vehicle, the sliding door apparatus comprising:
   a door configured to open or close a door opening portion formed in a vehicle body;
   a door arm including a first end portion rotatably connected to an end portion of the door, and a second end portion configured to be movable along a side sill of the vehicle body;
   a lower slider coupled to the second end portion of the door arm and configured to be rectilinearly movable along the side sill of the vehicle body;
   a lower arm plate connecting the second end portion of the door arm and the lower slider and configured to perform a rotation and a rectilinear movement when the lower slider moves along the side sill;
   a door power connection portion electrically connected to the lower arm plate, extending through the door arm, and configured to transmit power required for the door;
   a power plate provided in a movement route for the lower arm plate of the side sill and electrically connected to the door power connection portion; and
   a vehicle power connection portion electrically connected to the power plate and configured to transmit power, which is required for the door, to the door power connection portion through the power plate.

2. The sliding door apparatus of claim 1,
   wherein a plurality of first rollers rotatably coupled to the lower arm plate and is spaced from one another at predetermined intervals, and
   wherein the first rollers are inserted into a plurality of rails provided on an upper surface of the side sill and move therealong.

3. The sliding door apparatus of claim 2,
   wherein the first rollers include two rollers each including a first height, and two rollers each including a second height smaller than the first height, and the two rollers each including the first height and the two rollers each including the second height are alternately disposed, and
   wherein the plurality of rails each has a depth corresponding to the height of each of the two rollers each including the first height and the two rollers each including the second height.

4. The sliding door apparatus of claim 3,
   wherein each of the first rollers is coupled to a periphery of a roller shaft protruding on the lower arm plate,
   wherein a roller electrode is provided in the roller shaft and is provided to penetrate the roller shaft in a direction perpendicular to the lower arm plate,
   wherein an upper end portion of the roller electrode is in contact with the power plate to define electrical connection, and
   wherein a lower end portion of the roller electrode is in contact with the door power connection portion to define electrical connection.

5. The sliding door apparatus of claim 1, wherein the door power connection portion and the vehicle power connection portion are each configured as an electric wire.

6. The sliding door apparatus of claim 1, wherein the power plate is configured as a copper (Cu) plate.

7. The sliding door apparatus of claim 1, wherein the door power connection portion is inserted into a groove provided in the lower arm plate and disposed in a longitudinal direction of the door arm.

8. The sliding door apparatus of claim 4, wherein the roller electrode is provided in the roller shaft to which a roller, which has the first height among the first rollers, is coupled.

9. The sliding door apparatus of claim 1, wherein the second end portion of the door arm, the lower slider, and the lower arm plate are connected by an arm pin in a direction perpendicular to the vehicle body, and the door arm and the lower arm plate are configured to rotate about the arm pin.

10. The sliding door apparatus of claim 9, wherein the second end portion of the door arm has two layers disposed in a vertical direction, and the lower slider is coupled between the two layers of the second end portion of the door arm by the arm pin.

11. The sliding door apparatus of claim 10, wherein the lower arm plate is rotatably coupled to an upper surface of the door arm by the arm pin.

12. The sliding door apparatus of claim 1, wherein the first end portion of the door arm is hingedly and rotatably connected to the door by a door pin.

13. The sliding door apparatus of claim 12, wherein a second roller is mounted on an upper surface of the door arm between the first end portion and the second end portion of the door arm so that the door arm moves along a route through which the door arm turns toward the outside of the vehicle body.

* * * * *